US006970497B2

(12) United States Patent
Hoshino et al.

(10) Patent No.: US 6,970,497 B2
(45) Date of Patent: Nov. 29, 2005

(54) INTERMITTENT CALIBRATION APPARATUS

(75) Inventors: Masayuki Hoshino, Yokosuka (JP); Kazuyuki Miya, Kawasaki (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 828 days.

(21) Appl. No.: 09/936,297

(22) PCT Filed: Jan. 12, 2001

(86) PCT No.: PCT/JP01/00119

§ 371 (c)(1),
(2), (4) Date: Oct. 24, 2001

(87) PCT Pub. No.: WO01/54308

PCT Pub. Date: Jul. 26, 2001

(65) Prior Publication Data

US 2002/0159424 A1    Oct. 31, 2002

(30) Foreign Application Priority Data

Jan. 17, 2000    (JP)    .............................. 2000-007322

(51) Int. Cl.$^7$ ......................... H04B 1/69; H04B 1/707; H04B 1/713
(52) U.S. Cl. ...................... 375/141; 375/137; 375/144; 375/149; 375/213; 375/224; 342/174; 342/165; 455/115.1; 455/115.2; 455/226.1; 370/251; 370/247
(58) Field of Search .............................. 375/141, 137, 375/144, 146, 147, 149, 231, 213, 224; 342/360, 342/174, 165; 455/67.11, 67.14, 115.1, 115.2, 455/226.1; 370/251, 247, 241

(56) References Cited

U.S. PATENT DOCUMENTS

| 5,546,090 | A | | 8/1996 | Roy, III et al. |
| 5,936,569 | A | * | 8/1999 | Ståhla et al. ................. 342/174 |
| 6,084,545 | A | | 7/2000 | Lier et al. |
| 6,594,509 | B1 | * | 7/2003 | Takakusaki et al. ...... 455/562.1 |

FOREIGN PATENT DOCUMENTS

| EP | 0713261 A1 | 5/1996 |
| EP | 0881704 A2 | 12/1998 |
| EP | 881704 A2 * | 12/1998 | ............ H01Q 3/26 |
| EP | 0938204 A1 | 8/1999 |

(Continued)

OTHER PUBLICATIONS

Supplementary European Search Report dated Mar. 7, 2003.

(Continued)

Primary Examiner—Kevin Burd
Assistant Examiner—Juan Alberto Torres
(74) Attorney, Agent, or Firm—Stevens, Davis, Miller & Mosher, LLP (57) ABSTRACT

A base station receives a signal resulting from multiplexing a communication signal spread using a signal-specific spreading code and sent by mobile station apparatus and a calibration (CAL) signal spread using a signal-specific spreading code and sent for each unit frame for a predetermined time by a CAL radio signal generator in a same frequency band. An A/D conversion/despreading section and an A/D conversion/despreading section extract the communication signal and CAL signal from the received signal. A calibration processing section carries out calibration processing using the CAL signal in parallel with a communication using the communication signal. An array combining/signal processing section carries out demodulation processing on the communication signal using the calibration processing result.

6 Claims, 7 Drawing Sheets

FOREIGN PATENT DOCUMENTS

| | | |
|---|---|---|
| JP | 62001303 | 1/1987 |
| JP | 09138270 | 5/1997 |
| JP | 10336149 | 12/1998 |
| JP | 11046180 | 2/1999 |
| JP | 11068443 | 3/1999 |
| JP | 2000151255 | 5/2000 |
| JP | 2000295152 | 10/2000 |
| JP | 2001053527 | 2/2001 |

OTHER PUBLICATIONS

International Search Report dated Mar. 27, 2001.

* cited by examiner

INTERMITTENT CALIBRATION APPARATUS

TECHNICAL FIELD

The present invention relates to a communication apparatus in a CDMA-based mobile radio communication system, and more particularly, to a communication apparatus that carries out calibration.

BACKGROUND ART

Conventionally, a communication apparatus equipped with an array antenna is often used in a mobile radio communication system. This communication apparatus equipped with an array antenna is an apparatus with a plurality of antennas spatially distributed for controlling directivities of received signals based on information received by those antennas. A conventional communication apparatus equipped with an array antenna will be explained below by taking a case where this communication apparatus is mounted on a base station apparatus as an example with reference to FIG. 1.

Figure 1:
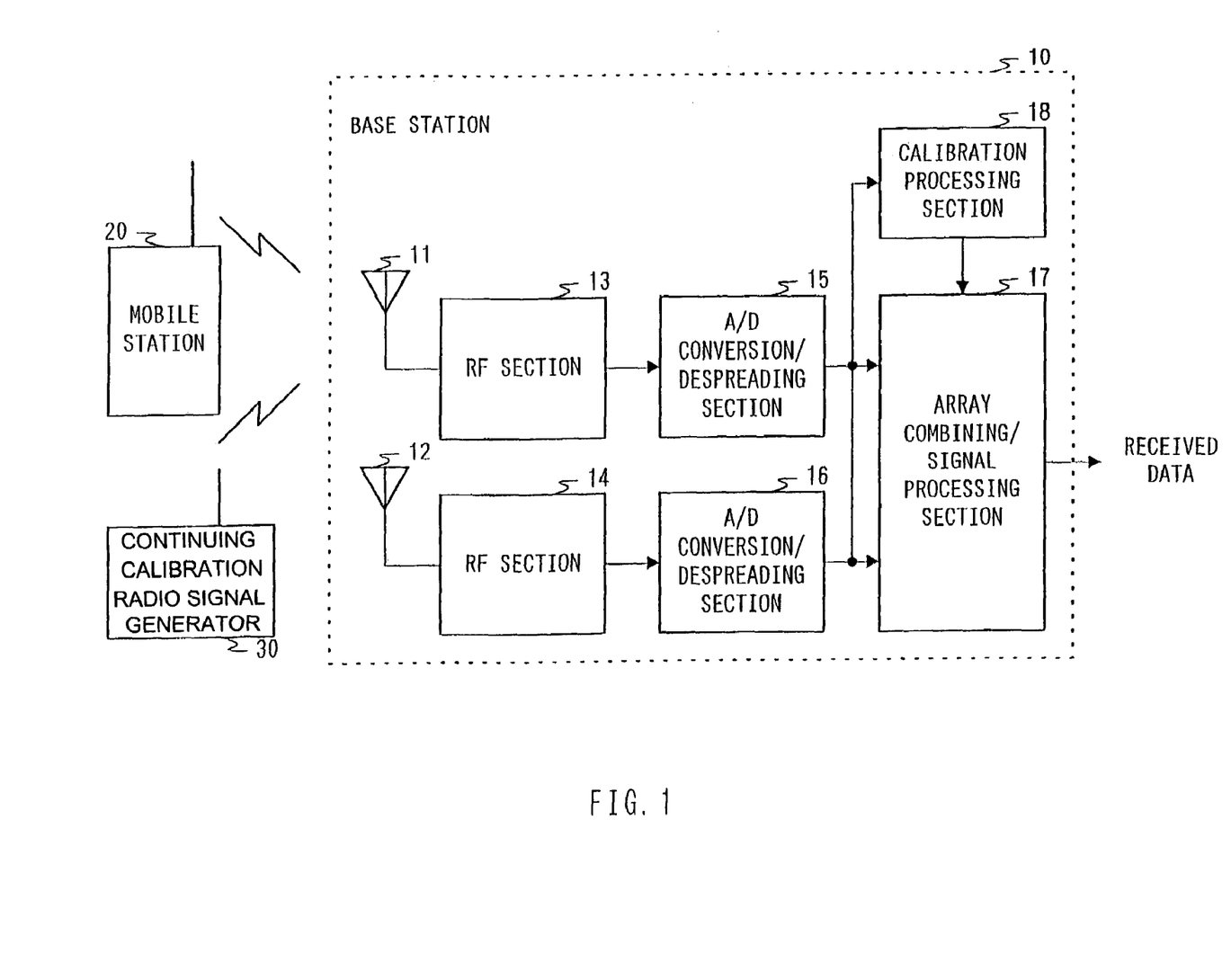
FIG. 1 illustrates a configuration of a base station apparatus equipped with a communication apparatus with a conventional array antenna and an appearance of a radio communication system including this base station apparatus and mobile station apparatus.

FIG. 1 illustrates a configuration of a base station apparatus equipped with a communication apparatus incorporating a conventional array antenna and an appearance of a radio communication system including this base station apparatus and mobile station apparatus. FIG. 1 shows a case where the above-described base station apparatus has two antennas.

A radio communication between base station apparatus 10 and mobile station apparatus 20 is carried out according to the following procedure. First, a signal sent by mobile station apparatus 20 is received by base station apparatus 10 via reception antenna 11 and reception antenna 12.

The signals received by reception antenna 11 and reception antenna 12 at base station apparatus 10 are each subjected to predetermined processing such as frequency conversion by RF section 13 and RF section 14. The signals subjected to the above-described processing by RF section 13 and RF section 14 are each subjected to A/D conversion processing and despreading processing by A/D conversion/despreading section 15 and A/D conversion/despreading section 16 and then output to array combining/signal processing section 17.

The input signals from A/D conversion/despreading section 15 and A/D conversion/despreading section 16 are each subjected to array processing by array combining/signal processing section 17, then subjected to signal processing such as RAKE combining or error correction and reception data is obtained. Furthermore, array combining/signal processing section 17 multiplies the above-described input signals by complex coefficients during the above-described signal processing to control directivities during reception. Through this, base station apparatus 10 obtains directivities, which are strong in the directions of desired signals and weak in the directions of interference signals, thus making it possible to obtain reception data with influences of interference signals reduced. That is, array combining/signal processing section 17 can obtain reception data free of influences of interference.

However, the characteristics of RF section 13 and RF section 14 vary depending on characteristic differences of analog elements incorporated and fluctuate every moment due to variations with time and temperature, etc. The same applies to A/D conversion/despreading section 15 and A/D conversion/despreading section 16.

Thus, the reception data obtained when the above-described components are used as they are comprises the signals received by reception antenna 11 and reception antenna 12 subjected to mutually different unknown amplitude fluctuations and phase rotations. As a result, base station apparatus 10 may have difficulty in acquiring originally intended directivities.

Therefore, in order to prevent the above-described phenomenon, processing is carried out which consists of measuring characteristics of RF section 13, RF section 14, A/D conversion/despreading section 15 and A/D conversion/despreading section 16 and determining complex amplitudes to be multiplied by array combining/signal processing section 17 taking into account the respective characteristic differences. Such processing is called "calibration".

Calibration is carried out as follows. First, calibration radio signal generator 30 sends a calibration radio signal. This calibration signal is received by base station apparatus 10 via reception antenna 11 and reception antenna 12.

The signals received by the above-described antennas at base station apparatus 10 are subjected to processing similar to that described above by RF section 13 and A/D conversion/despreading section 15, and RF section 14 and A/D conversion/despreading section 16.

Calibration processing section 18 measures characteristic errors using signals output from the respective A/D conversion/despreading sections. Furthermore, during a normal communication, such correction values that allow array combining/signal processing section 17 to cancel out characteristic errors that exist in RF section 13 and A/D conversion/despreading section 15, and RF section 14 and A/D conversion/despreading section 16 are stored in a correction table in calibration processing section 18. This is the method for carrying out calibration.

After calibration, array combining/signal processing section 17 carries out the above-described signal processing to minimize influences of characteristic errors that exist in RF section 13, RF section 14, A/D conversion/despreading section 15 and A/D conversion/despreading section 16 with reference to the correction table in calibration processing section 18.

The following two types of method are available as the methods for combining normal communication and calibration. The first method is the one that provides a time to execute calibration (process a radio signal for calibration) in the communication system as a whole in addition to the time for a normal communication. That is, during a time provided besides the time for a normal communication, calibration radio signal generator 30 sends a calibration radio signal and base station apparatus 10 carries out calibration using this calibration radio signal.

The second method is the one that executes calibration simultaneously with a normal communication. That is, calibration radio signal generator 30 always sends a radio signal for calibration and base station apparatus 10 performs calibration using this calibration radio signal while carrying out a communication with mobile station apparatus 20.

However, the communication apparatus equipped with a conventional array antenna has the following problems. First, in the case where the above-described first method is used, base station apparatus 10 must interrupt a communication with mobile station apparatus 2 to carry out calibration. This deteriorates the processing efficiency in a communication between base station apparatus 10 and mobile station apparatus 2.

Further, in the case where the above-described second method is used, since calibration radio signal generator 30 always sends a calibration radio signal, the signal that base station apparatus 10 receives from mobile station apparatus 20, which is a communication terminal apparatus, always contains interference components from this calibration radio signal.

That is, since the signal sent from mobile station apparatus 20 to base station apparatus 10 always receives interference from the above-described calibration radio signal, the signal received by base station apparatus 10 is already affected by interference for a long period of time. For this reason, the received signal at base station apparatus 10 contains errors continuously for a long period of time, which is likely to make communications between base station apparatus 10 and mobile station apparatus 20 difficult.

DISCLOSURE OF INVENTION

It is an object of the present invention to provide an intermittent calibration apparatus for carrying out directivity control while reducing interference with the communication terminal apparatus, without interrupting a communication with the communication terminal apparatus.

This object is attained by sending a calibration signal spread by a spreading code specific to the signal for a predetermined time for each unit frame.

BEST MODE FOR CARRYING OUT THE INVENTION

With reference now to the attached drawings, embodiments of the present invention will be explained in detail below.

(Embodiment 1)

Figure 2:
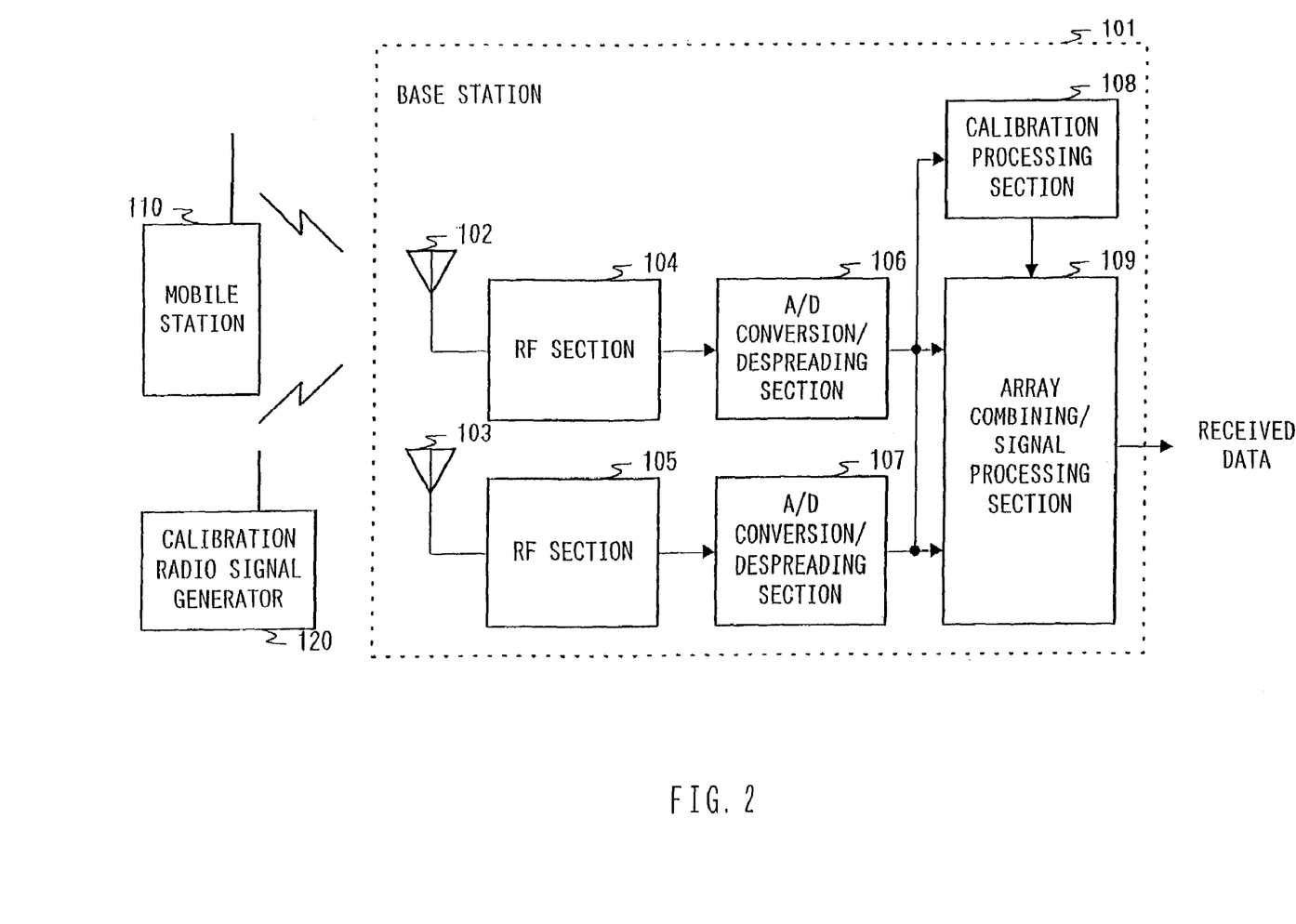
FIG. 2 is a block diagram showing a configuration of a communication system using an intermittent calibration apparatus according to Embodiment 1 of the present invention.

FIG. 2 is a block diagram showing a configuration of a communication system using an intermittent calibration apparatus according to Embodiment 1 of the present invention. FIG. 2 shows how base station apparatus 101 equipped with the intermittent calibration apparatus according to this embodiment carries out a CDMA-based radio communication with mobile station apparatus 110 and how calibration radio signal generator (hereinafter referred to as "CAL signal generator") 120 sends a calibration radio signal (hereinafter referred to as "CAL signal") to base station apparatus 101. Here, the number of mobile station apparatuses that carry out a radio communication with base station apparatus 101 is assumed to be 1, but there is no limitation to the number of mobile station apparatuses.

First, a normal communication carried out between mobile station apparatus 110 and base station apparatus 101 will be explained. Each communication terminal apparatus of base station apparatus 101 is assigned any one of a plurality of mutually different spreading codes provided for a CDMA-based communication system. A signal sent by mobile station apparatus 110 is multiplexed with signals sent by other mobile station apparatuses in the same frequency band and received by base station apparatus 101 via reception antenna 102 and reception antenna 103.

The signals received by reception antenna 102 and reception antenna 103 at base station 101 are subjected to predetermined processing such as frequency conversion by RF section 104 and RF section 105, respectively. The signals subjected to the above-described predetermined processing by RF section 104 and RF section 105 are subjected to A/D conversion processing and despreading processing by A/D conversion/despreading section 106 and A/D conversion/despreading section 107 and then output to array combining/signal processing section 109. The sections carrying out despreading processing of A/D conversion/despreading section 106 and A/D conversion/despreading section 107 carry out despreading processing using a plurality of mutually different spreading codes.

The input signals from A/D conversion/despreading section 106 and A/D conversion/despreading section 107 are each subjected to array processing by array combining/signal processing section 109, then subjected to signal processing such as RAKE combining and error correction and reception data is obtained. Furthermore, array combining/signal processing section 109 multiplies the above-described input signals by a complex coefficient during the above-described signal processing to control directivities of base station apparatus 101 during reception. In this way, base station apparatus 101 acquires directivities, which are strong in the directions of desired signals and weak in the directions of interference signals, making it possible to acquire reception data with reduced influences of interference signals. That is, array combining/signal processing section 109 can acquire reception data stripped of influences of interference.

Figure 3:
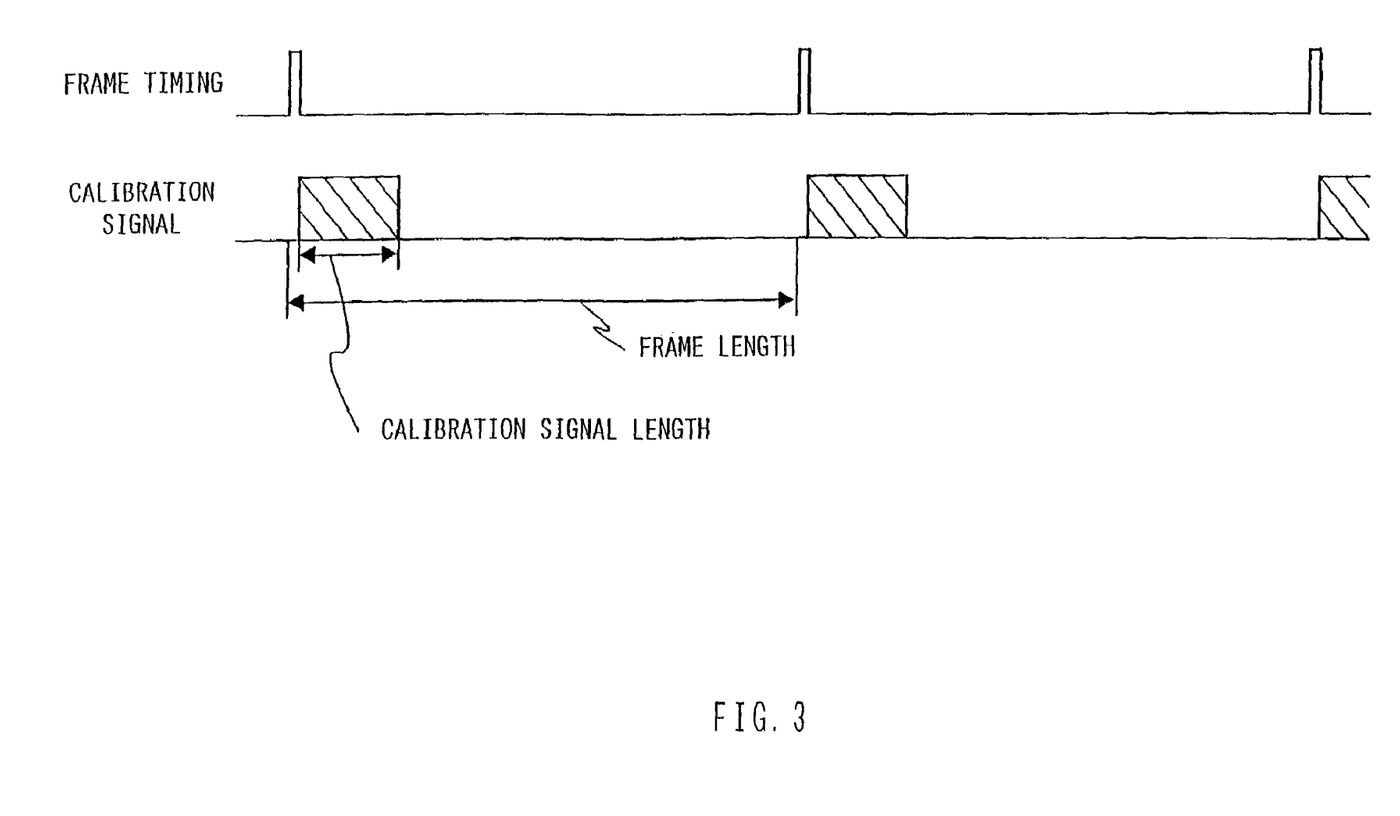
FIG. 3 is a schematic diagram showing an example of transmission timing of a calibration (CAL) signal in a communication system using the intermittent calibration apparatus according to Embodiment 1 of the present invention.

In parallel with the above-described normal communication, base station apparatus 101 executes calibration intermittently using CAL signals sent from CAL signal generator 120. This calibration will be explained further using FIG. 3 below. FIG. 3 is a schematic diagram showing an example of transmission timing for CAL signals by CAL signal generator 120 in a communication system using the intermittent calibration apparatus according to Embodiment 1 of the present invention.

CAL signal generator 120 is fixedly assigned one of the above-described pluralities of mutually different spreading codes. This allows CAL signal generator 120 to send CAL signals basically at any time. For convenience of explanations, the spreading code fixedly assigned to CAL signal generator 120 is called a "CAL spreading code". The spreading section (not shown) at CAL signal generator 120 spreads a CAL signal using the spreading code assigned to this CAL signal generator 120.

Furthermore, the transmission section (not shown) at CAL signal generator 120 can generate frame timing and sends the CAL signal spread by the above-described spreading section using this frame timing as a trigger. That is, the transmission section at CAL signal generator 120 generates frame timing as shown in the first row in FIG. 3 and sends the spread CAL signal at the timing shown in the second row in FIG. 3 using this frame timing as a trigger.

Furthermore, as shown in the second row in FIG. 3, the transmission section at CAL signal generator 120 does not always send the spread CAL signal but sends the spread CAL signal for a time period corresponding to a predetermined signal length. The length of this spread CAL signal is determined as appropriate according to various conditions such as the level of a calibration effect at base station apparatus 101, the degree of interference of base station apparatus 101 on the communication terminal apparatus (here mobile station 110).

FIG. 3 shows a case where the timing of generation of a spread CAL signal and signal length are common to frames, but the present invention is also applicable to a case where the timing of generation of the spread CAL signal and signal length are changed from one frame to another. In this case, it may be arranged that the timing of generation of the spread CAL signal and signal length are recognized by base station 101.

The CAL signal sent from CAL signal generator 120 is multiplexed with signals sent by a communication terminal apparatus (here, mobile station apparatus 110) of base station apparatus 10 in the same frequency band and received by base station apparatus 101 via reception antenna 102 and reception antenna 103. The signals received by the respective reception antennas are subjected to processing similar to the above-described processing during normal communication by RF section 104 and A/D conversion/despreading section 106, and RF section 105 and A/D conversion/despreading section 107, respectively.

Here, the sections carrying out despreading processing of A/D conversion/despreading section 106 and A/D conversion/despreading section 107 also carry out despreading processing using the spreading codes fixedly assigned to CAL signal generator 120. These signals despread using the respective spreading codes are output together with signals despread using other spreading codes to array combining/signal processing section 109.

Furthermore, calibration processing section 108 carries out calibration using signals obtained by the despreading processing using CAL spreading codes. Here, calibration by calibration processing section 108 will be explained.

First, an observation of output signals of A/D conversion/despreading section 106 and A/D conversion/despreading section 107 (more specifically, output signals from the sections carrying out despreading processing of the above-described A/D conversion/despreading sections using the respective CAL spreading codes) is started using the frame timing generated by CAL signal generator 120 as a trigger.

After this, deviations of the amplitude and phase of the above-described observed output signals from a desired signal point for a time period corresponding to a predetermined CAL signal length (see FIG. 3) will be measured. This measurement result is averaged over the above-described time period. A characteristic error for each reception radio system (two systems in FIG. 2) is measured in this way. Further, correction values are calculated such that characteristic errors that exist in RF section 104 and RF section 105, and A/D conversion/despreading section 106 and A/D conversion/despreading section 107 are cancelled out through processing at array combining/signal processing section 109. Suppose, for example, an amount of variation when the received signal passes through RF section 104 and A/D conversion/despreading section 106 is $Ae^{j\Theta}$ and an amount of variation when the received signal passes through RF section 105 and A/D conversion/despreading section 107 is $Be^{j\Phi}$. The characteristic errors in the respective radio systems can be canceled out when array combining/signal processing section 109 multiplies the despread signal from A/D conversion/despreading section 106 by $1/Ae^{-j\Theta}$ and multiplies the despread signal from A/D conversion/despreading section 107 by $1/Be^{-j\Phi}$. These "$1/Ae^{-j\Theta}$" and "$1/Be^{-j\Phi}$" can be used as correction values in the respective reception radio systems. These correction values are written in the correction table. This is what calibration by calibration processing section 108 is all about.

After such calibration is completed, array combining/signal processing section 109 references the correction table in calibration processing section 108 and carries out array processing and demodulation processing on the output signals of the above-described A/D conversion/despreading processing sections so as to minimize influences of the characteristic errors that exist in RF section 104 and RF section 105, and A/D conversion/despreading section 106 and A/D conversion/despreading section 107. This makes it possible to obtain reception data with desired directivities irrespective of the characteristic errors at RF section 104 and A/D conversion/despreading section 106, and RF section 105 and A/D conversion/despreading section 107.

As shown above, since the CAL signal generator only (intermittently) sends a despread CAL signal in a specific section of each unit frame, it is possible to reduce interference with the base station apparatus equipped with the intermittent calibration apparatus according to this embodiment and each communication terminal apparatus of this base station apparatus. That is, the CAL signal generator sends no signal except during transmission of a CAL signal, and therefore the CAL signal generator causes no interference with the base station apparatus equipped with the intermittent calibration apparatus according to this embodiment and each communication terminal apparatus described above. In other words, the CAL signal generator can shorten a time (section) of interfering with the base station apparatus equipped with the intermittent calibration apparatus according to this embodiment and each communication terminal apparatus described above.

Thus, even if some interference is received, the time for receiving this interference is short, and therefore the base station apparatus equipped with the intermittent calibration apparatus according to this embodiment and each communication terminal apparatus described above are unlikely to receive signals involving errors for a long period of time. This makes it possible to improve the effects of error correction processing, and thereby allows the base station apparatus equipped with the intermittent calibration apparatus according to this embodiment and each communication terminal apparatus described above to carry out reliable communications.

Further, the base station apparatus equipped with the intermittent calibration apparatus according to this embodiment can perform calibration without interrupting communications with each communication terminal apparatus. This also prevents deterioration of the processing efficiency in communications between the above-described base station apparatus and each communication terminal apparatus.

As shown above, this embodiment can provide an intermittent calibration apparatus that carries out directivity control while reducing interference with the communication terminal apparatus, without interrupting communications with the communication terminal apparatus.

This embodiment describes the case where the CAL signal generator transmits one CAL signal for a predetermined time for each unit frame, but the present invention is not limited to this and can also be applied to cases where the CAL signal generator transmits two or more CAL signals for a predetermined time for each unit frame. Furthermore, the present invention can also be applied to cases where transmission or no transmission of a CAL signal is changed for each unit frame.

Figure 7:
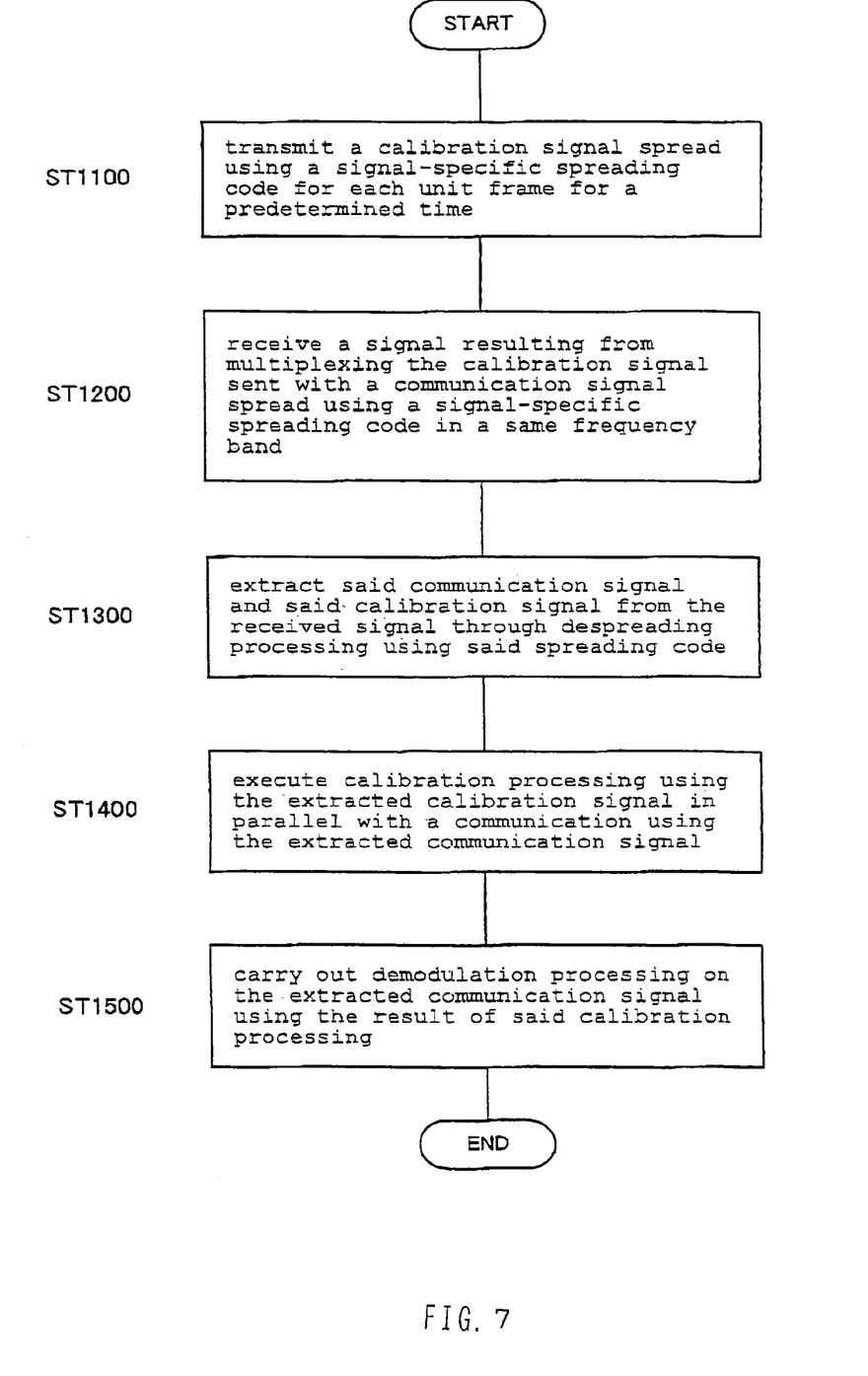
FIG. 7 illustrates a calibration method of the first embodiment.

FIG. 7 illustrates a calibration method of the first embodiment. According to this method, a calibration signal spread using a signal-specific spreading code, for each unit frame within a predetermined time, is transmitted ST1100. A signal resulting from multiplexing the calibration signal sent with a communication signal spread using a signal-specific spreading code in the same freguency band is received ST1200. The communication signal and the calibration signal are extracted ST1300 from the received signal through despreading processing using the spreading code. Calibration processing is executed ST1400 using the extracted calibration signal in parallel with a communication using the extracted communication signal. And demodulation processing is executed ST1500 on the extracted communication signal using the result of the calibration processing.

(Embodiment 2)

This embodiment will describe a case where influences of interference of a CAL signal with each communication terminal apparatus are further suppressed using interleave. The intermittent calibration apparatus according to this embodiment will be explained with reference to FIG. 4.

Figure 4:
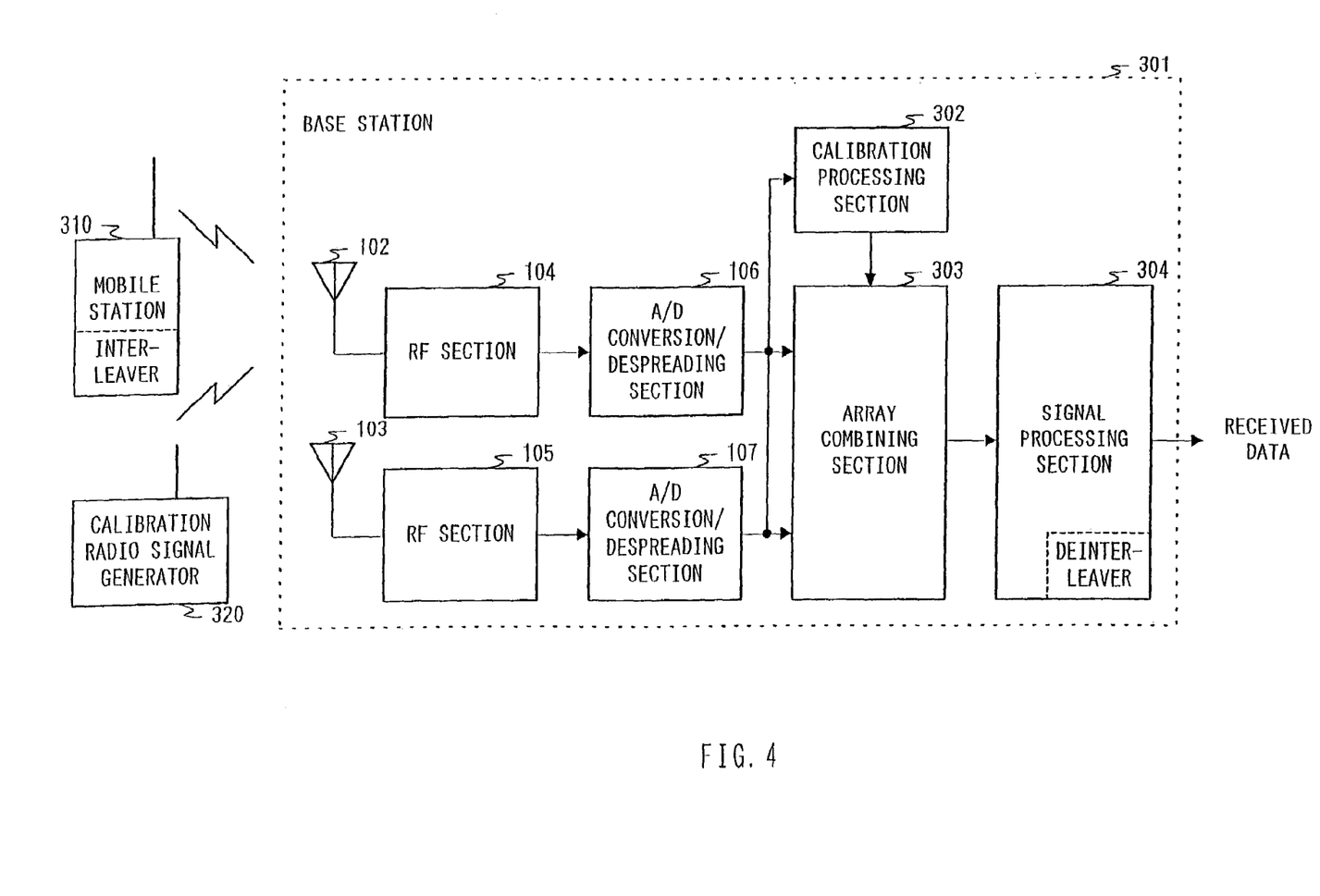
FIG. 4 is a block diagram showing a configuration of a communication system using an intermittent calibration apparatus according to Embodiment 2 of the present invention.

FIG. 4 is a block diagram showing a configuration of a communication system using the intermittent calibration apparatus according to Embodiment 2 of the present invention. The configurations in FIG. 4 similar to those in Embodiment 1 (FIG. 2) are assigned the same reference numerals as those in FIG. 2 and detailed explanations thereof will be omitted.

Figure 5:
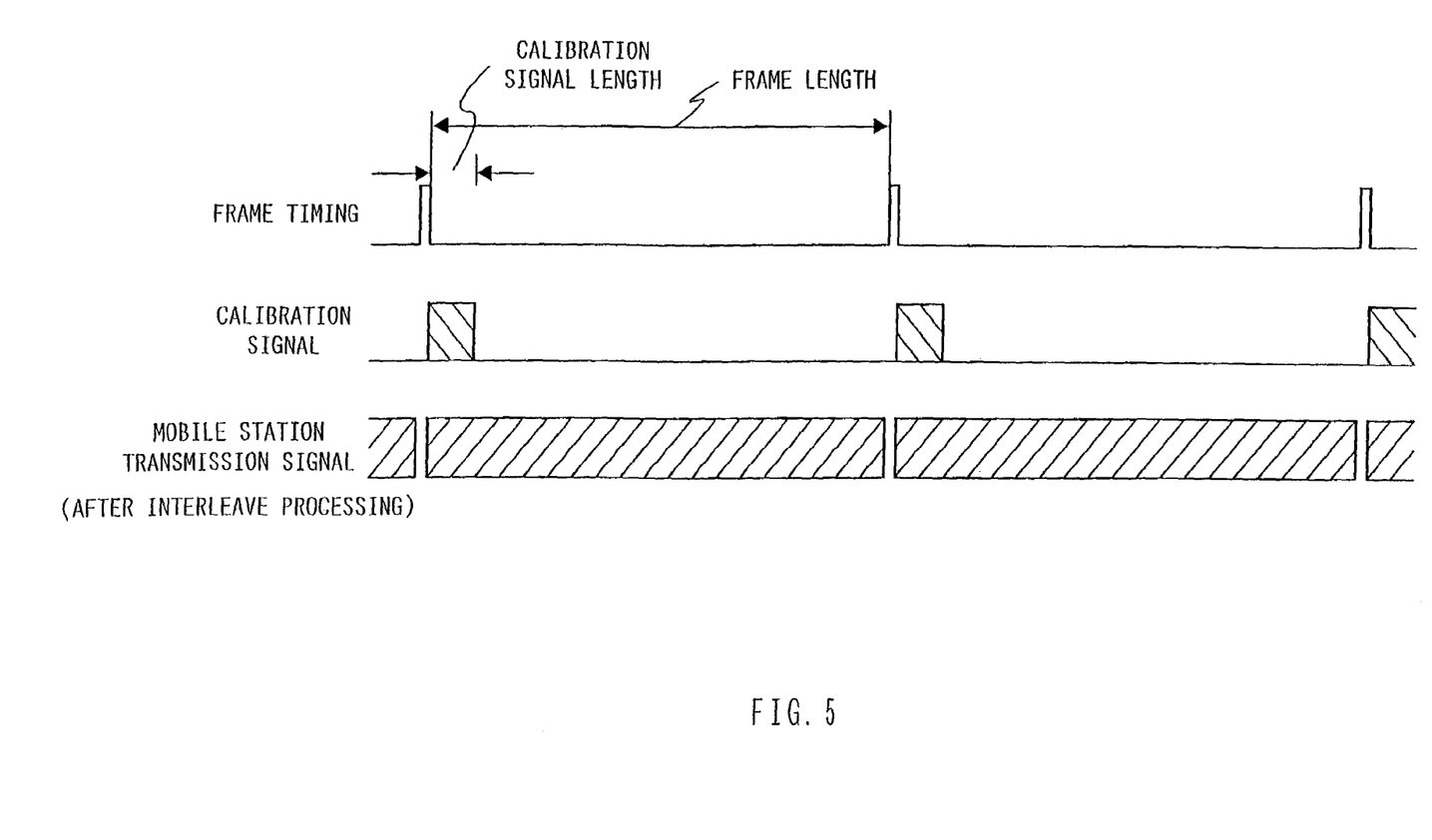
FIG. 5 is a schematic diagram showing an example of transmission timing of a CAL signal in the communication system using the intermittent calibration apparatus according to Embodiment 2 of the present invention.

The basic configuration of CAL signal generator 320 is similar to that of CAL signal generator 120 in Embodiment 1. CAL signal generator 320 differs from CAL signal generator 120 in the following points. FIG. 5 is a schematic diagram showing an example of transmission timing of a CAL signal by CAL signal generator 320 in a communication system using the intermittent calibration apparatus according to Embodiment 2 of the present invention.

The transmission section (not shown) of CAL signal generator 320 can generate frame timing and slot timing and sends a spread CAL signal using this frame timing as a trigger. That is, the transmission section (not shown) of CAL signal generator 320 generates frame timing as shown in the first row in FIG. 5 and sends a spread CAL signal of a 1-slot length as shown in the second row in FIG. 5 using this frame timing as a trigger.

Mobile station apparatus 310 is provided with an interleaver and sends an interleaved signal to base station apparatus 301 at timing as shown in the third row in FIG. 5. Various types of interleave such as chip interleave and symbol interleave can be used as interleave carried out by mobile station apparatus 310.

A CAL signal sent by CAL signal generator 320 and a signal sent by mobile station apparatus 310 are multiplexed in the same frequency band and received by base station apparatus 301 via reception antenna 102 and reception antenna 103.

Base station apparatus 301 equipped with the intermittent calibration apparatus according to this embodiment includes modified calibration processing section 108 and array combining/signal processing section 109 in base station apparatus 101 of Embodiment 1.

Calibration processing section 302 starts to observe the output signals of A/D conversion/despreading section 106 and A/D conversion/despreading section 107 (more specifically, output signals from the sections carrying out despreading processing of the above-described A/D conversion/despreading sections using the respective CAL spreading codes) using the frame timing generated by CAL signal generator 320 as a trigger. Furthermore, calibration processing section 302 measures deviations of the amplitude and phase of the above-described observed output signals from a desired signal point for a time period corresponding to the CAL signal length (1-slot length) shown in FIG. 5.

Array combining section 303 and signal processing section 304 result from separation of the two parts of array combining/signal processing section 109 and signal processing section 304 consists of signal processing section 109 plus a deinterleaver. This signal processing section 304 carries out deinterleave processing on the array-combined signal, then error correction processing and demodulation processing and there by outputs reception data. Here, the deinterleave that corresponds to the interleave by mobile station apparatus 310 is used as deinterleave by signal processing section 304.

Figure 6:
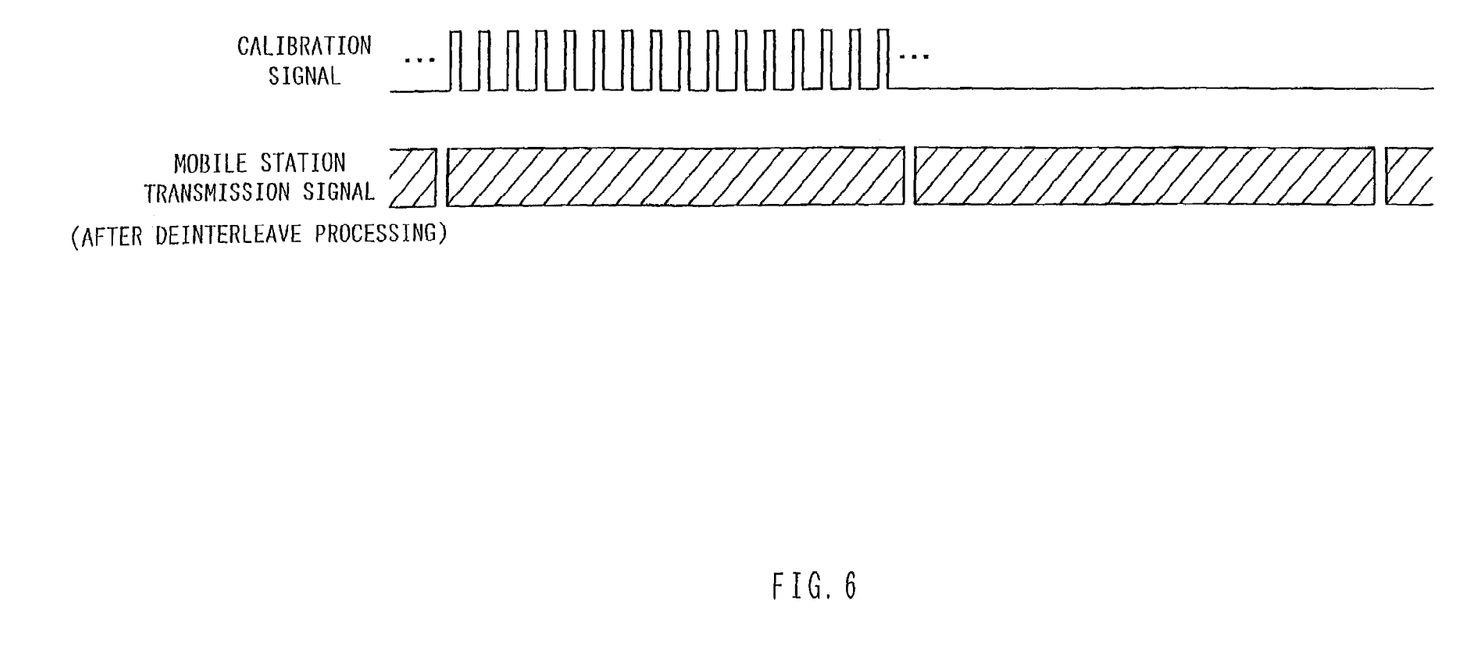
FIG. 6 is a conceptual drawing showing influences of interference by a CAL signal on a received signal obtained from the base station apparatus equipped with the intermittent calibration apparatus according to Embodiment 2 of the present invention.

Then, the effects of transmission of the interleaved signal by mobile station apparatus 310 and deinterleave processing by base station apparatus 301 will be explained with reference to FIG. 6. FIG. 6 is a conceptual diagram showing influences of interference of a CAL signal on the received signal obtained by the base station apparatus equipped with the intermittent calibration apparatus according to Embodiment 2 of the present invention.

The second row in FIG. 6 shows a transmission signal from the mobile station apparatus received and deinterleaved by base station apparatus 301. The first row shows how the CAL signal sent by CAL signal generator 320 is deinterleaved.

As is apparent from FIG. 6, the component corresponding to the CAL signal is further fragmented on the time scale viewed from the transmission signal of the mobile station apparatus received by base station apparatus 301. That is, interference by the CAL signal in the above-described transmission signal is never concentrated on a predetermined time. This suppresses the possibility that errors will occur during error correction processing by signal processing section 304.

Thus, according to this embodiment, not only the CAL signal generator sends a CAL signal over a specific section of each unit frame (intermittently) but also the communication terminal apparatus sends an interleaved signal and the base station apparatus equipped with the intermittent calibration apparatus according to this embodiment deinterleaves the signal from the above-described communication terminal apparatus and thereby obtains reception data, and therefore influences of interference by the CAL signal on the reception data obtained are scattered with time.

This makes it possible to further shorten the interference section given to the base station apparatus equipped with the intermittent calibration apparatus according to this embodiment and each communication terminal apparatus compared to Embodiment 1. Therefore, being able to improve the effects of error correction processing, the base station apparatus equipped with the intermittent calibration apparatus according to this embodiment and each communication terminal apparatus described above can provide better communications.

The intermittent calibration apparatus according to the present invention can be incorporated in a base station apparatus used in a digital mobile communication system.

As described above, the present invention sends a calibration signal spread using a signal-specific spreading code for each unit frame for a predetermined time and can thereby provide an intermittent calibration apparatus for carrying out directivity control while reducing interference with the communication terminal apparatus, without interrupting a communication with the communication terminal apparatus.

This application is based on the Japanese Patent Application No.2000-007322 filed on Jan. 17, 2000, entire content of which is expressly incorporated by reference herein.

INDUSTRIAL APPLICABILITY

The present invention is ideally applicable to the field of communication apparatuses in CDMA-based mobile radio communication systems, and more specifically, to the field of communication apparatuses carrying out calibration.

What is claimed is:

1. An intermittent calibration apparatus comprising:
   receiving means for receiving a signal resulting from multiplexing a communication signal spread using a signal-specific spreading code and sent, and a calibration signal spread using a signal-specific spreading code and sent for each unit frame for a predetermined time in a same frequency band;
   extracting means for extracting said communication signal and said calibration signal from the received signal through despreading processing using said spreading code;
   calibration means capable of executing calibration processing using the extracted calibration signal in parallel with a communication using the extracted communication signal; and
   demodulating means for carrying out demodulation processing on the extracted communication signal using the result of said calibration processing.

2. The intermittent calibration apparatus according to claim 1, wherein said communication signal is subjected to interleave processing before being transmitted and said demodulating means carries out deinterleave processing corresponding to said interleave processing on the demodulated signal obtained through said demodulation processing.

3. A base station apparatus equipped with the intermittent calibration apparatus according to claim 1.

4. A communication terminal apparatus for carrying out radio communications with the base station apparatus according to claim 3.

5. A calibration method comprising:
   a transmitting step of transmitting a calibration signal spread using a signal-specific spreading code for each unit frame for a predetermined time;
   a receiving step of receiving a signal resulting from multiplexing the calibration signal sent with a communication signal spread using a signal-specific spreading code in a same frequency band;
   an extracting step of extracting said communication signal and said calibration signal from the received signal through despreading processing using said spreading code;
   a calibration step capable of executing calibration processing using the extracted calibration signal in parallel with a communication using the extracted communication signal; and
   a demodulating step of carrying out demodulation processing on the extracted communication signal using the result of said calibration processing.

6. The calibration method according to claim 5, wherein said communication signal is subjected to interleave processing before being transmitted and said demodulating step further comprises a deinterleave step of carrying out deinterleave processing corresponding to said interleave processing on the demodulated signal obtained through said demodulation processing.

* * * * *